(12) United States Patent
Berker et al.

(10) Patent No.: US 7,743,325 B2
(45) Date of Patent: Jun. 22, 2010

(54) METHOD AND COMPUTER-READABLE MEDIUM FOR FITTING TEXT TO SHAPES WITHIN A GRAPHIC

(75) Inventors: Ilan Berker, Seattle, WA (US); Jason C. Costa, Seattle, WA (US); Keywon Chung, Seattle, WA (US); Matthew J. Kotler, Kenmore, WA (US); Janet L. Schorr, Seattle, WA (US); Scott A. Sherman, Seattle, WA (US); Karen K. Wong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 11/081,324

(22) Filed: Mar. 15, 2005

(65) Prior Publication Data

US 2006/0212801 A1    Sep. 21, 2006

(51) Int. Cl.
*G06F 17/21* (2006.01)

(52) U.S. Cl. ............... 715/246; 715/247; 715/256; 715/272; 345/619; 706/19

(58) Field of Classification Search ............... 715/517, 715/518, 520, 521, 530, 531, 539, 540, 243, 715/244, 246, 247, 255, 256, 272, 227, 211, 715/234, 249; 706/15, 19; 345/619
See application file for complete search history.

(56) References Cited

U.S. PATENT DOCUMENTS

| | | | | |
|---|---|---|---|---|
| 5,214,755 A * | 5/1993 | Mason | ............... | 715/521 |
| 5,426,729 A | 6/1995 | Parker | ............... | 345/441 |
| 5,557,722 A | 9/1996 | DeRose | | |
| 5,596,691 A | 1/1997 | Good et al. | | |
| 5,619,631 A | 4/1997 | Schott | ............... | 345/440 |
| 5,649,216 A * | 7/1997 | Sieber | ............... | 715/506 |

(Continued)

FOREIGN PATENT DOCUMENTS

EP    0 431 638 A2    6/1991

(Continued)

OTHER PUBLICATIONS

U.S. Official Action dated Apr. 20, 2006 cited in U.S. Appl. No. 10/955,271.

(Continued)

*Primary Examiner*—Adam L Basehoar
(74) *Attorney, Agent, or Firm*—Merchant & Gould

(57) ABSTRACT

A method and computer-readable medium are provided for fitting text to shapes within a graphic. According to the method, initial constraints are defined that comprise initial values describing how a shape and text within the shape should be laid out. Constraint rules are also defined for use in modifying the initial constraints when application of the initial constraints to the text in a shape results in the text overflowing the boundaries of the shape. A change may be detected to the graphic that would affect the size or position of one or more of the shapes or the text within one of the shapes. If such a change causes text to overflow when laid out using the initial constraints, the constraint rules are applied sequentially to modify the constraints. The modified constraints are then reapplied to the shapes to create a new layout for the graphic.

20 Claims, 8 Drawing Sheets

U.S. PATENT DOCUMENTS

| | | | |
|---|---|---|---|
| 5,669,006 A * | 9/1997 | Joskowicz et al. | 715/517 |
| 5,732,229 A * | 3/1998 | Dickinson | 715/764 |
| 5,818,447 A | 10/1998 | Wolf et al. | |
| 5,903,902 A | 5/1999 | Orr et al. | 707/517 |
| 5,909,220 A | 6/1999 | Sandow | |
| 5,956,737 A | 9/1999 | King et al. | 715/517 |
| 5,999,731 A | 12/1999 | Yellin et al. | 395/704 |
| 6,057,842 A | 5/2000 | Knowlton et al. | |
| 6,057,858 A | 5/2000 | Desrosiers | |
| 6,081,816 A * | 6/2000 | Agrawal | 715/521 |
| 6,166,738 A | 12/2000 | Robertson et al. | 345/355 |
| 6,173,286 B1 * | 1/2001 | Guttman et al. | 707/100 |
| 6,189,132 B1 * | 2/2001 | Heng et al. | 716/11 |
| 6,204,859 B1 | 3/2001 | Jouppi et al. | |
| 6,256,650 B1 | 7/2001 | Cedar et al. | 707/517 |
| 6,289,502 B1 | 9/2001 | Garland et al. | 717/2 |
| 6,289,505 B1 | 9/2001 | Goebel | 717/9 |
| 6,301,704 B1 | 10/2001 | Chow et al. | 717/9 |
| 6,305,012 B1 | 10/2001 | Beadle et al. | 717/5 |
| 6,308,322 B1 | 10/2001 | Serocki et al. | 717/9 |
| 6,324,686 B1 | 11/2001 | Komatsu et al. | 717/5 |
| 6,405,225 B1 | 6/2002 | Apfel et al. | |
| 6,667,750 B1 * | 12/2003 | Halstead et al. | 715/788 |
| 6,826,727 B1 * | 11/2004 | Mohr et al. | 715/235 |
| 6,944,830 B2 | 9/2005 | Card et al. | 715/853 |
| 6,956,737 B2 | 10/2005 | Chen et al. | |
| 7,055,095 B1 | 5/2006 | Anwar | 715/523 |
| 7,107,525 B2 * | 9/2006 | Purvis | 715/517 |
| 7,178,102 B1 | 2/2007 | Jones et al. | |
| 7,348,982 B2 | 3/2008 | Schorr et al. | 345/441 |
| 7,379,074 B2 | 5/2008 | Gerhard et al. | |
| 7,423,646 B2 | 9/2008 | Saini et al. | |
| 2001/0051962 A1 * | 12/2001 | Plotkin | 707/522 |
| 2002/0065852 A1 | 5/2002 | Hendrickson et al. | |
| 2002/0111969 A1 * | 8/2002 | Halstead, Jr. | 707/517 |
| 2003/0079177 A1 | 4/2003 | Brintzenhofe et al. | |
| 2004/0111672 A1 | 6/2004 | Bowman et al. | 715/513 |
| 2004/0133854 A1 | 7/2004 | Black | 715/517 |
| 2004/0148571 A1 * | 7/2004 | Lue | 715/514 |
| 2004/0205602 A1 * | 10/2004 | Croeni | 715/517 |
| 2005/0007382 A1 | 1/2005 | Schowtka | 345/619 |
| 2005/0091584 A1 | 4/2005 | Bogdan et al. | |
| 2005/0094206 A1 * | 5/2005 | Tonisson | 358/1.18 |
| 2005/0132283 A1 * | 6/2005 | Diwan et al. | 715/517 |
| 2005/0157926 A1 | 7/2005 | Moravec | |
| 2005/0273730 A1 | 12/2005 | Card et al. | 345/440 |
| 2005/0289466 A1 | 12/2005 | Chen | 715/731 |
| 2006/0064642 A1 | 3/2006 | Iyer | 715/730 |
| 2006/0066627 A1 | 3/2006 | Gerhard et al. | |
| 2006/0066631 A1 | 3/2006 | Schorr et al. | 345/619 |
| 2006/0070005 A1 | 3/2006 | Gilbert | |
| 2006/0209093 A1 | 9/2006 | Berker et al. | |
| 2006/0277476 A1 | 12/2006 | Lai | 715/760 |
| 2006/0294460 A1 * | 12/2006 | Chao et al. | 715/520 |
| 2007/0006073 A1 | 1/2007 | Gerhard et al. | |
| 2007/0055939 A1 | 3/2007 | Furlong et al. | 715/731 |
| 2007/0112832 A1 | 5/2007 | Wong | |
| 2008/0046803 A1 | 2/2008 | Beauchamp et al. | |
| 2008/0136822 A1 | 6/2008 | Schorr et al. | 345/441 |
| 2008/0282147 A1 * | 11/2008 | Schorr | 715/247 |
| 2008/0288916 A1 | 11/2008 | Tazoe | |
| 2009/0019453 A1 | 1/2009 | Kodaganur | |
| 2009/0327954 A1 | 12/2009 | Danton | |

FOREIGN PATENT DOCUMENTS

| | | |
|---|---|---|
| EP | 1 111 543 A2 | 6/2001 |
| EP | 1 111 543 A3 | 6/2001 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

Copending U.S. Appl. No. 10/955,271, filed Sep. 30, 2004, entitled: "Method, System, And Computer-Readable Medium For Creating And Laying Out A Graphic Within An Application Program".

Copending U.S. Appl. No. 10/957,103, filed Sep. 30, 2004, entitled: "Editing the Text of an Arbitrary Graphic Via Hierarchical List".

Copending U.S. Appl. No. 11/081,323, filed Mar. 15, 2005, entitled: "Method and Computer-Readable Medium for Generating Graphics Having a Finite Number of Dynamically Sized and Positioned Shapes".

European Search Report dated Feb. 13, 2006.

U.S. Final Office Action dated Oct. 3, 2006 cited in U.S. Appl. No. 10/955,271.

U.S. Office Action dated Jan. 22, 2007 cited in U.S. Appl. No. 11/081,323.

EP Search Report cited in EP 05 10 5366.8-2218 dated Jan. 2, 2006.

EP Search Report cited in EP 05 10 8636.1-2218 dated Jan. 2, 2006.

"Proquis Compliance Management & Document Control Solutions", http://www.proquis.com/allclear-text2chart.asp, 1 pg.

"Exploring the Layouts", 1999 Software Publishing Corporation, 2 pgs.

"Create Diagrams in Word 2002, Excel 2002, and PowerPoint 2002", http://office.microsoft.com/en-us/assistance/HA010346141033. aspx, 2 pgs.

Roderick Singleton, "OpenOffice.org User Guide for Version 1.1.x", May 7, 2004, ONLINE, XP002348571, retrieved from the Internet: URL:www.openoffice.org>, retrieved Sep. 30, 2005; pgs. 253-284.

U.S. Office Action dated Apr. 17, 2007 cited in U.S. Appl. No. 10/955,271.

U.S. Final Office Action dated Jul. 6, 2007 cited in U.S. Appl. No. 11/081,323.

U.S. Appl. No. 12/035,878, filed Feb. 22, 2008 entitled "Method, System, and Computer-Readable Medium For Creating and Laying Out A Graphic Within An Application Program".

U.S. Office Action dated May 16, 2007 cited in U.S. Appl. No. 10/957,103.

U.S. Final Office Action dated Oct. 23, 2007 cited in U.S. Appl. No. 10/957,103.

U.S. Office Action dated Oct. 31, 2006 cited in U.S. Appl. No. 11/013,630.

U.S. Office Action dated Jan. 23, 2008 cited in U.S. Appl. No. 11/081,323.

U.S. Final Office Action dated Jul. 18, 2008 cited in U.S. Appl. No. 11/081,323.

U.S. Office Action dated Mar. 19, 2008 cited in U.S. Appl. No. 10/957,103.

Russell Borland, "Running Microsoft Word 97", 1997, Published by Microsoft Press. Pertinent pp. 60-61.

Chinese Office Action dated Jul. 4, 2008 cited in Application No. 200510099652.6

U.S. Final Office Action dated Sep. 12, 2008 cited in U.S. Appl. No. 10/957,103.

European Communication dated Dec. 17, 2008 cited in Application No. 06111105.0—1527 / 1703417.

U.S. Office Action dated Jan. 14, 2009 cited in U.S. Appl. No. 10/957,103.

U.S. Office Action dated Feb. 18, 2009 cited U.S. Appl. No. 11/081,323.

Chinese Second Office Action dated Feb. 20, 2009 cited in Application No. 200610004498.4

Chinese Office Action dated Aug. 29, 2008 cited in Application No. 200610004498.4.

Mexican Office Action dated Dec. 4, 2008 cited in Application No. PA/a/2005/009276.

EP Communication dated Jul. 10, 2009 cited in Application No. 06 111 105.0.

U.S. Final Office Action dated Jul. 21, 2009 cited in U.S. Appl. No. 10/957,103.

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 21 pgs.

Mexican Office Action dated May 25, 2009 cited in Application No. PA/a/2005/009276.

U.S. Office Action dated Nov. 27, 2006 cited in U.S. Appl. No. 11/172,279.

"Styling Nested Lists," [online] Oct. 19, 2003 [accessed Nov. 13, 2006], SimpleBits, LLC, Retrieved from Internet URL:http://www.simplebits.com/notebook/2003/10/19/styling_nestled_lists.html, pp. 1-5.

John Gallant et al., Archive.org archive of "CSS Flyouts—Part One," [online] Jun. 24, 2005 [accessed Nov. 13, 2006], CommunityMX, Retrieved from Internet URL:http://web.archive.org/web/20050624075147/http://www.communitymx.com/content/article.cfm?page=3&cid=55A69, 2 pgs.

U.S. Final Office Action dated May 17, 2007 cited in U.S. Appl. No. 11/172,279.

U.S. Office Action dated Mar. 6, 2008 cited in U.S. Appl. No. 11/172,279.

U.S. Final Office Action dated Aug. 19, 2008 cited in U.S. Appl. No. 11/172,279.

U.S. Office Action dated Apr. 29, 2009 cited in U.S. Appl. No. 11/172,279.

"Css Zen Garden: The Beauty in CSS Design," Retrieved from archive.org.http://web.archive.org/web/20031001180317/http://www.csszengarden.com/, Oct. 1, 2003, retrieved Nov. 8, 2009, 3 pgs.

U.S. Office Action dated Feb. 18, 2010 cited in U.S. Appl. No. 10/957,103.

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.

Copending U.S. Appl. No. 12/723,127 filed Mar. 12, 2010 entitled "Reordering Nodes in a Hierarchal Structure".

yEd Graph Editor - Published Date: 2009; New yEd version 3.4.1, http://www.yworks.com/en/products_yed_about.html, 5 pgs.

LingCh by Elod Csirmaz - Retrieved Date: Jan. 11, 2010, http://www.postminart.org/csirmaz/lingch.txt., 5 pgs.

Australian Examiner's First Report dated Apr. 21, 2010 cited in Application No. 2005203708.

* cited by examiner

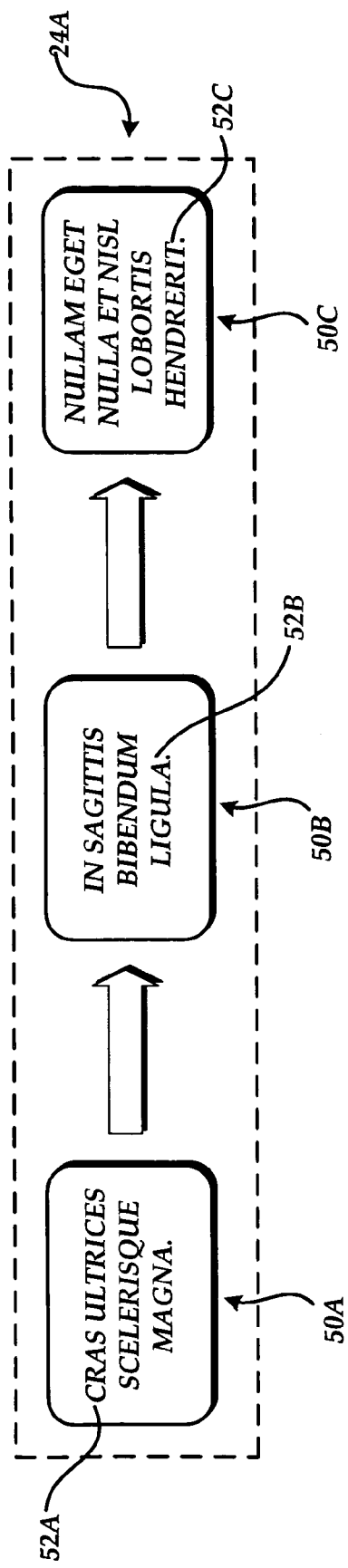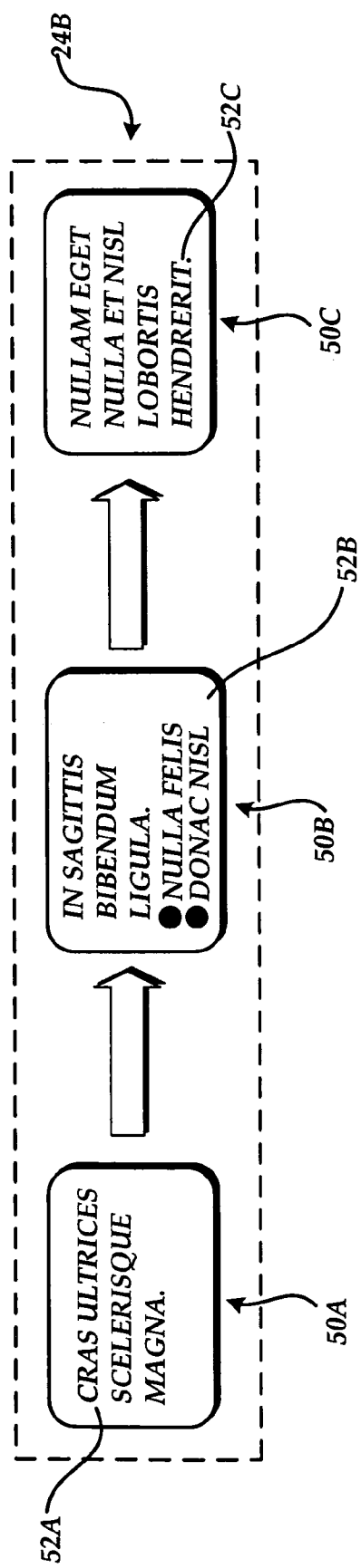

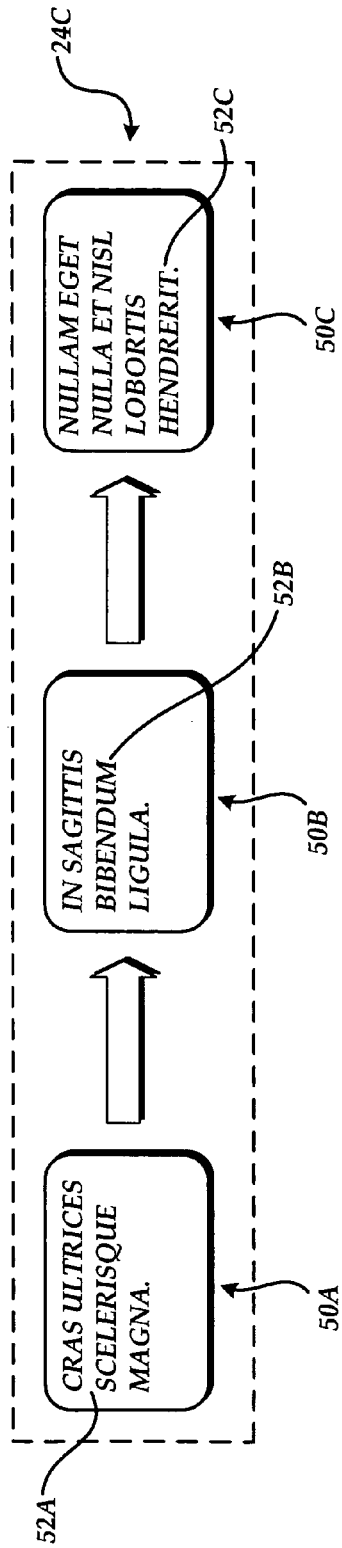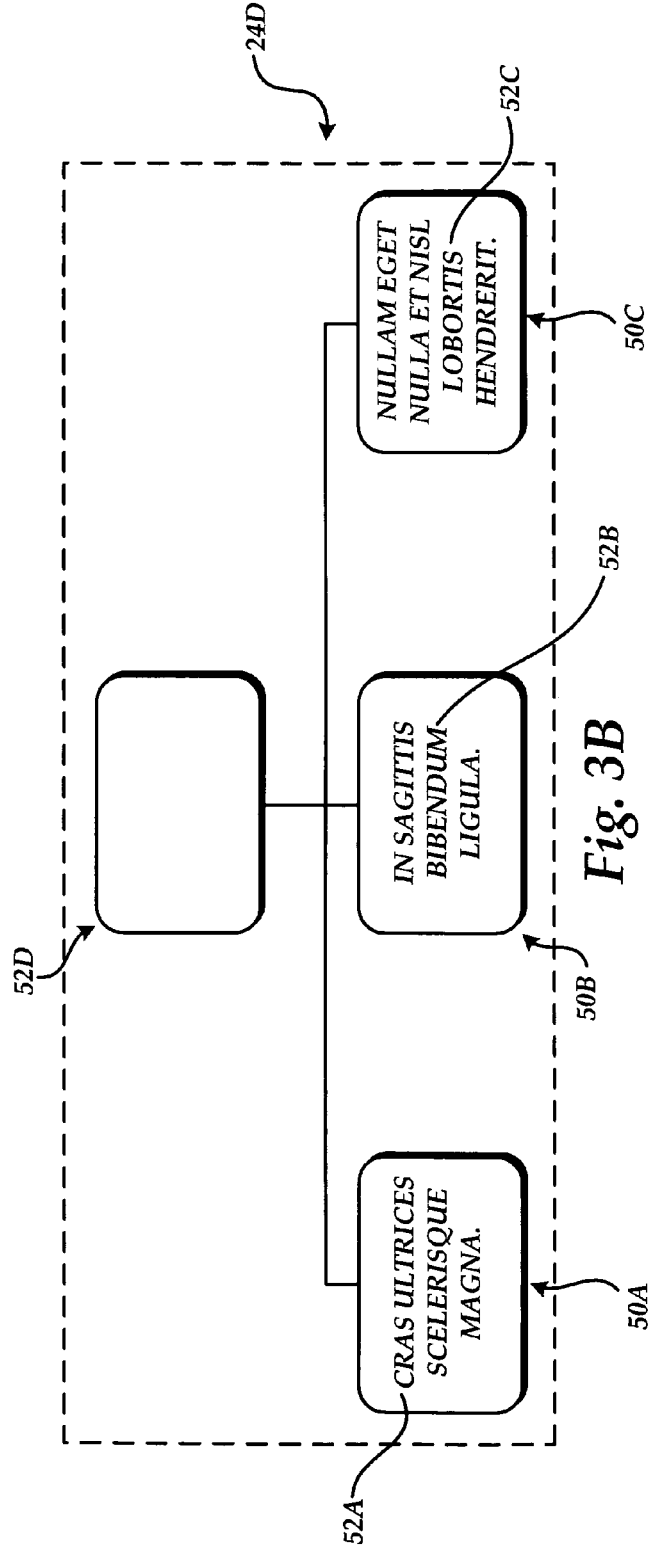

```
<LAYOUTNODE>
<ALGORITHM TYPE = "TEXT" />
<SHAPE TYPE = "RECTANGLE" />
<CONSTRAINTS>
    <CONSTRAINT TYPE = "WIDTH" VALUE = "1500" />
    <CONSTRAINT TYPE = "HEIGHT" REFTYPE = "WIDTH" VALUE = "0.667" />
    <CONSTRAINT TYPE = "PARENT TEXT SIZE" VALUE = "36" />
    <CONSTRAINT TYPE = "CHILD TEXT SIZE" VALUE = "36" />
</CONSTRAINTS>
<RULES>
    <RULE TYPE = "WIDTH" LIMIT = "3000" />
    <RULE TYPE = "HEIGHT" LIMIT = "1.5" LIMITISFACTOR = "TRUE"
    <RULE TYPE = "PARENT TEXT SIZE" LIMIT = "16" />
    <RULE TYPE = "CHILD TEXT SIZE" LIMIT = "16" />
    <RULE TYPE = "HEIGHT" LIMIT = "3000" />
    <RULE TYPE = "PARENT TEXT SIZE" LIMIT = "4" />
</RULES>
</LAYOUTNODE>
```

*Fig. 6*

METHOD AND COMPUTER-READABLE MEDIUM FOR FITTING TEXT TO SHAPES WITHIN A GRAPHIC

CROSS-REFERENCE TO RELATED APPLICATIONS

This patent application is related to U.S. patent application Ser. No. 10/955,271, now U.S. Pat. No. 7,348,982, entitled "Method, System, and Computer Readable Medium for Creating and Laying Out a Graphic Within an Application Program" filed on Sep. 30, 2004, to U.S. patent application Ser. No. 11/081,323, entitled "Method and Computer-Readable Medium For Generating Graphics Having A Finite Number of Dynamically Sized and Positioned Shapes," filled concurrently herewith, and to U.S. patent application Ser. No. 10/957,103, entitled "Editing The Text Of An Arbitrary Graphics Via A Hierarchical List," filed on Sep. 30, 2004, each of which are assigned to the same assignee as this application. The aforementioned patent applications are expressly incorporated herein, in their entirety, by reference.

BACKGROUND OF THE INVENTION

Today's word processors and dedicated drawing application programs enable users to create both simple and complex graphics. These programs allow users to create graphics using a variety of shapes which may be annotated with text. The graphics created by these applications may be stand-alone documents or incorporated into text documents. Despite the advantages offered by these programs, however, today's versions of these programs suffer from several drawbacks which hinder the creation and layout of graphics by the typical user.

One particular drawback of current drawing programs is that these programs typically utilize defaults for text properties (e.g. margins, line spacing, etc.) that are generic across all shapes and graphics. In most cases, these defaults do not look optimal across a wide range of graphics. As a result, users must manually override the default properties to obtain a professional looking graphic. This can be frustrating and time consuming for users.

Another drawback of current drawing programs is that these programs require a user to manually resize text within shapes as shapes and text are added to graphics. For instance, if a user adds text to a shape that overflows the boundaries of the shape, the user must manually resize the graphic or the text so that the text fits completely within the shape. This problem can be extremely time consuming when a large number of shapes with text are utilized in a graphic. This problem is compounded by the fact that many graphics look best when text is sized equally across related shapes. In order to accomplish this utilizing current drawing programs, a user must manually resize the text in each of the related shapes. This also can be time consuming and frustrating for a computer user.

It is with respect to these considerations and others that the various embodiments of the present invention have been made.

BRIEF SUMMARY OF THE INVENTION

In accordance with the present invention, the above and other problems are solved by a method and computer-readable medium for fitting text into one or more shapes in a graphic. According to the method, one or more initial constraints are defined that comprise initial values describing how a shape and text within the shape should be laid out. For instance, initial constraints may be specified indicating the font face, font size, and character attributes of the text to be laid out. One or more constraint rules are also defined for use in modifying the initial constraints when application of the initial constraints to the text in a shape results in the text overflowing the boundaries of the shape. One or more parameters may be defined that affect the layout of text within a shape but that are not modified by rules.

According to one embodiment of the invention, a change may be detected to the graphic that would affect the size or position of one or more of the shapes or the text within one of the shapes. For instance, a shape may be added or removed, the layout of the graphic may be changed, the font may be changed, or text may be added to or removed from a shape within the graphic. In response to detecting such a change, the initial constraints are applied. If the text overflows the shapes, then the constraint rules are applied sequentially to modify the constraints. The modified constraints are then reapplied to the shapes to create a new layout for the graphic.

According to another embodiment of the invention, applying the constraint rules to modify the constraints includes first identifying a shape in the graphic having text that does not fit inside the shape. When such a shape has been identified, a first constraint rule is identified within a graphic definition file that is associated with the identified shape. The constraint rule identifies a limit for a constraint associated with the shape. A search, such as a binary search, is then performed to identify a value of the constraint between the initial constraint value and the limit that results in the text fitting within the identified shape. According to an embodiment, the identified value comprises a value that is closest to the initial constraint while allowing the text to fit within the shape.

If a value is identified during the search that results in the text fitting within the shape, the identified value for the constraint is applied to the shape. If a value cannot be located that results in the text fitting within the shape, the limit is applied to the shape and a next constraint rule is identified and applied to the shape. Alternatively, an intermediate value identified by the rule may be applied to the shape. In this manner, each of the constraint rules associated with a shape is applied to the shape in a sequential fashion. According to embodiments, rules that do not assist in locating a layout wherein the text fits within the shape may be skipped. If application of all of the constraint rules does not result in the text fitting within the shape, a predefined rule guaranteed to ensure that text does not flow outside the shape may be applied. For instance, a rule may be applied that truncates the text and adds ellipses so that no text extends outside the shape.

According to another embodiment of the invention, a computer-readable medium having a data structure stored thereon is provided. The data structure includes a set of data fields containing data representing one or more initial constraints for fitting text to shapes in a graphic. The constraints comprise initial values describing how text within one or more of the shapes should be laid out.

According to an embodiment, the data structure also includes a second data field containing data representing one or more constraint rules for fitting text to the shapes. The constraint rules comprise rules for modifying the constraints when application of the constraints does not result in text being successfully laid out completely within a shape. In particular, each constraint rule comprises a limit value for at least one constraint. The constraint rules may be utilized to modify the font size, margins, word-wrapping, hyphenation, kerning, line-spacing and other attributes of text within a shape.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 2A-4 are block diagrams showing graphics produced by an illustrative drawing program according to one embodiment of the invention;

FIG. 6 is a block diagram illustrating a portion of the contents of a graphic definition file utilized in one embodiment of the invention.

DETAILED DESCRIPTION OF THE INVENTION

Figure 1:
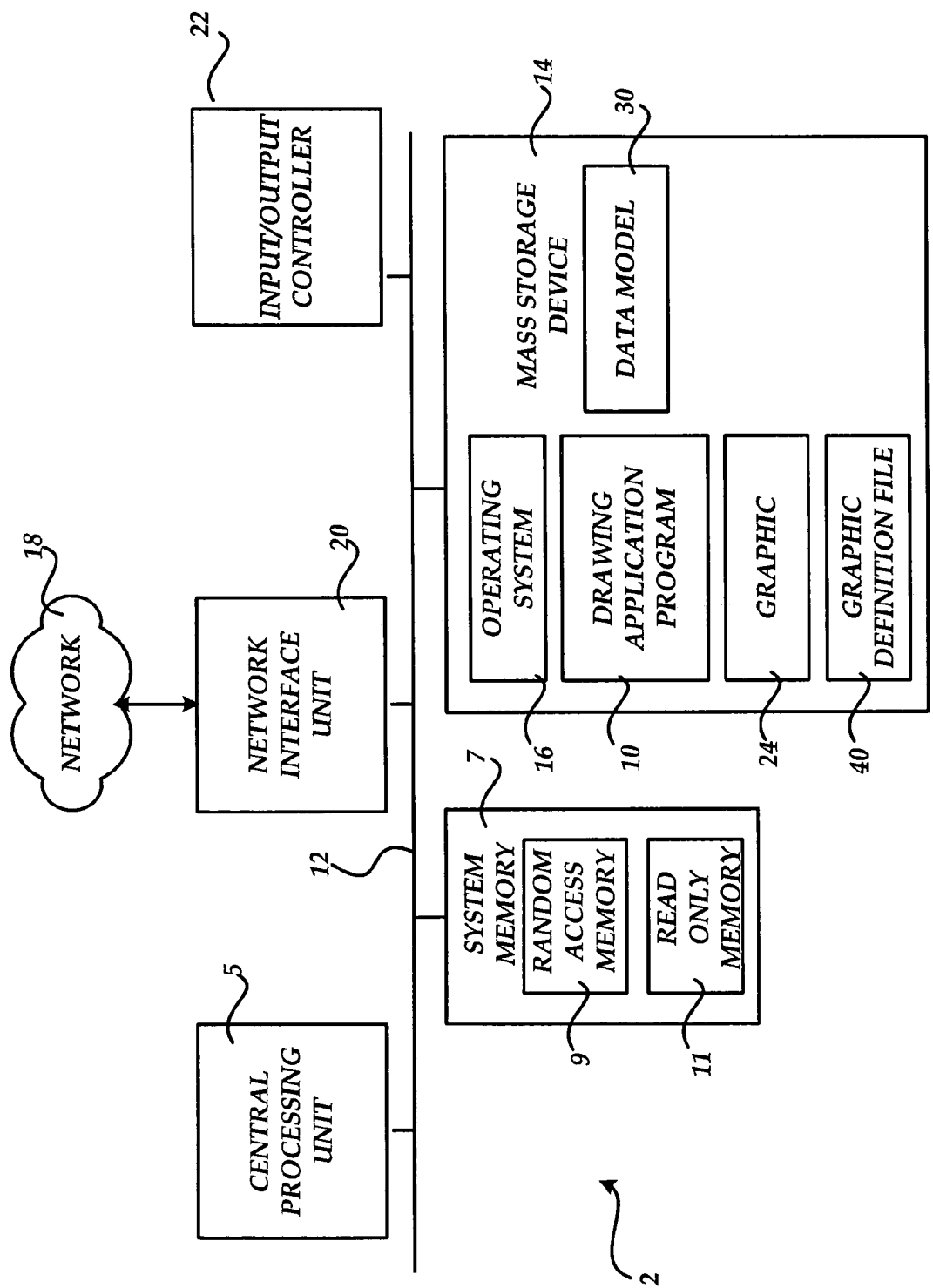
FIG. 1 is a computer system architecture graphic illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a drawing application program 10. The drawing application program 10 is operative to provide functionality for the creation and layout of graphics, such as the graphic 24. According to one embodiment of the invention, the drawing application program 10 comprises any one of the programs in the OFFICE suite of application programs from MICROSOFT CORPORATION including the WORD, EXCEL, and POWERPOINT application programs.

The mass storage device 14 may also store several components which are utilized in the creation and layout of graphics within the drawing application program 10. In particular, the components may include a data model 30 and a graphic definition file 40. In various embodiments of the invention, the drawing application program 10 reads in the graphic definition file 40 for instructions regarding the creation and layout of graphics. It will be appreciated that in one embodiment of the invention, the data model 30 and the graphic definition file 40 may be stored as individual files in the computer system 2 which are accessed by the drawing application program 10.

The data model 30 includes a collection of nodes, relationships, text, and properties that contains the content for constructing the graphic 24. The graphic definition file 40 is a collection of data which describes how to create a specific graphic layout. In various embodiments of the invention, the graphic definition file 40 may be formatted utilizing the extensible markup language ("XML"). As is understood by those skilled in the art, XML is a standard format for communicating data. In the XML data format a schema is used to provide XML data with a set of grammatical and data type rules governing the types and structures of data that may be communicated. The XML data format is well-known to those skilled in the art, and therefore not discussed in further detail herein. The aspects of a graphic described by the graphic definition file 40 include the name of the layout algorithm to use for each layout node, algorithm parameters, constraints, and constraint rules for constructing the layout tree, defaults for shape geometry and style properties, graphic classification data, and a sample data model. Additional details regarding the contents and use of the graphic definition file 40 can be found in U.S. patent application Ser. No. 10/955,271, now U.S. Pat. No. 7,348,982, entitled "Method, System, and Computer Readable Medium for Creating and Laying Out a Graphic Within an Application Program" filed on Sep. 30, 2004, which is expressly incorporated herein by reference.

Constraints are conditions used by a layout algorithm for creating a graphic. An example of a constraint is the value to be used for a shape's width. It will be appreciated that constraints may include numeric values or Boolean values. Numeric constraints can specify a specific numeric value (e.g., width=1 inch). Numeric constraints may also calculate their value by referring to other constraint values using references (e.g., height=width*0.75). Boolean constraints may include equality constraints which force all nodes in a set to have the same value as another constraint, and may include inequality constraints, where one constraint value is limited based on another constraint value (e.g. shape's width needs to be less-than or greater-than another shape's height).

Constraints may be propagated between layout nodes to enforce equality between drawing elements (e.g., all normal nodes have the same font size) or inequality (e.g., width of transition nodes should be <=normal node width). Constraints may be propagated by attaching a shared propagator to a constraint which propagates its states to other layout nodes. It will be appreciated that both constraints and constraint rules may be updated on the other nodes from the propagating constraint.

Constraint rules are a description of how to modify a set of constraints if they are unable to be met by a layout algorithm. For instance, a constraint may specify that a font size must be 14 points, but a constraint rule may specify that a font size can decrease to a minimum of 8 points.

According to one embodiment of the invention, the constraints comprise initial values describing how a shape and text within the shape should be laid out. In this regard, constraint rules may be specified that comprise rules for modifying the constraints when application of the constraints does not result in text being successfully laid out within the boundaries of a shape. Additional details regarding the structure and use of the constraints and constraint rules and the contents of the graphic definition file 40 will be provided below with respect to FIG. 4.

Referring now to FIGS. 2A-2B, several illustrative graphics 24A and 24B generated by an embodiment of the invention will be described. As shown in FIG. 2A, the graphic 24A comprises the shapes 50A, 50B, and 50C. Each of the shapes includes text 52A, 52B, and 52C, respectively. According to one embodiment of the invention, text block, paragraph, and character properties such as margins, spacing, and alignment can be changed dynamically based on the structure of the data to provide the most aesthetic text layout. For instance, if the text 52B in the shape 50B is edited to add several bullet points, the alignment of the text 52B may be changed from centered to left aligned. This is reflected in the left justified text 52B shown in FIG. 2B.

According to one embodiment of the invention, text alignment across multiple shapes may also be modified dynamically based on data changes. For instance, in response to adding bullets to the text 52B, the alignment of the text 52B may be changed from centered to left aligned as described above. Additionally, the alignment of the text 52A and 52C in the shapes 50A and 50B may also be changed from centered to left aligned in response to the changes to the text 52B. This is reflected in the text 52A and 52C shown in FIG. 2B.

Turning now to FIGS. 3A-3B, additional aspects of the invention will be presented with respect to the graphics 24C and 24D. The graphic 24C includes the shapes 50A, 50B, and 50C having text 52A, 52B, and 52C, respectively. The text 52A, 52B, and 52C is top and left aligned. If the user changes diagram types, such as from the process graphic shown in FIG. 3A to the hierarchy graphic 24D shown in FIG. 3B, the text 52A, 52B, and 52C is mapped to the appropriate shapes in the graphic 24D. Moreover, in response to the change in graphic style, the alignment of the text in each of the shapes 52A-52D is changed from top-left aligned to center aligned. This change occurs because the graphic definition file associated with the graphic 24D indicates that text should be center aligned.

Figure 4:
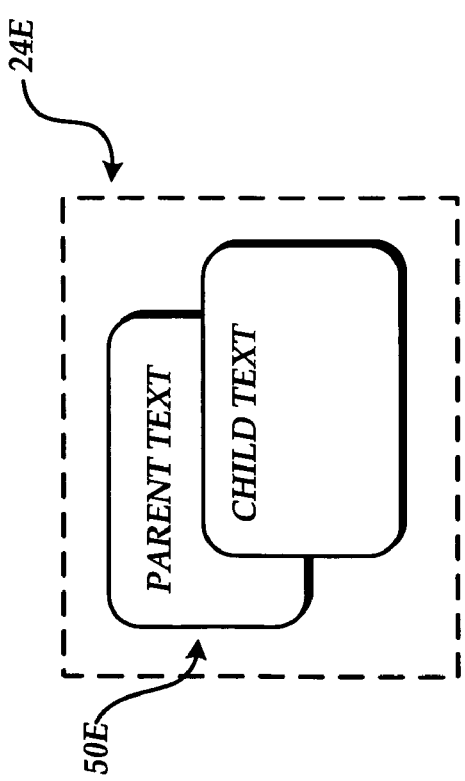

Referring now to FIG. 4, additional details regarding the types of formatting changes that may be applied through the embodiments of the invention will be described. FIG. 4 shows a graphic 24E that includes a shape 50E. The shape 50E is a compound shape made up of a parent shape and one child shape. Compound shapes include a parent shape and may have any number of children shape. It should be appreciated that it is not necessary to utilize a compound shape with the embodiments of the invention. The algorithms provided herein can operate with any combination of shapes. As will be described in greater detail below, the size and formatting of a shape may be varied to ensure that any text associated with the shape fits completely inside the shape. The formatting and size of the text may also be varied. According to one embodiment of the invention, the text and shape of a parent shape may be varied independently of a child shape. Similarly, a child shape may be varied independently of its parent shape. In this manner, any portion of a compound shape can be varied independently of any other portion. Additional details regarding this process will be described below.

Figure 5:
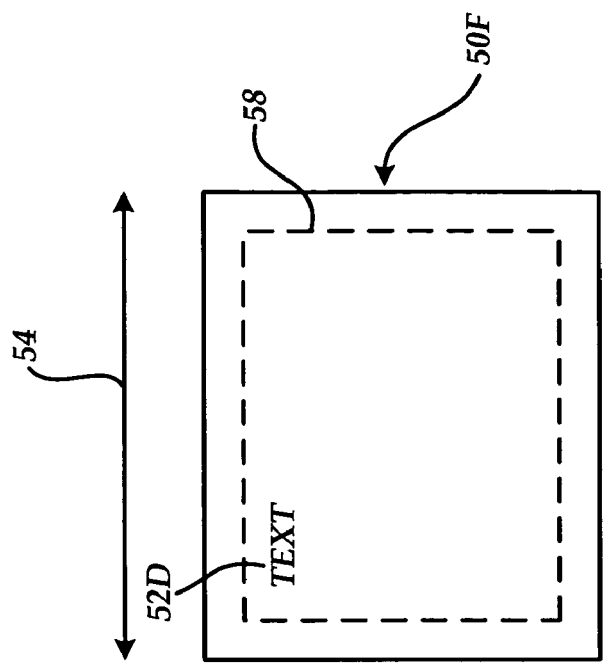
FIG. 5 is a block diagram illustrating several possible constraints for a shape utilized in one embodiment of the invention.

Turning now to FIG. 5, additional details regarding the aspects of a shape and its associated text that may be modified to ensure that the shape encompasses the text will be described. In particular, FIG. 5 shows a shape 50F. The shape 50F has associated text 52D. The shape 50F also includes an inside margin 58, a vertical dimension 56, and a horizontal dimension 54. As will be described in greater detail below, the vertical and horizontal dimensions of the shape 50F may be altered so that the text 52D will fit completely inside the shape. Similarly, the inside margin 58 may also be altered as specified to allow the text 52D to fit within the shape 50F. Attributes of the text 52D, such as the font size and text alignment, may also be modified in an attempt to fit the text 52D within the shape 50F. It should be appreciated that the algorithms provided herein may be utilized on a body of text bound by any geometric shape.

As will be described in greater detail below, the graphic definition file 40 includes constraint rules that define which attributes of the shape 50F and text 52D should be modified in attempt to fit the text 52D and the order in which they should be modified. It should be appreciated that the attributes of the shape 50F and text 52D shown in FIG. 5 and described herein are merely illustrative and that other attributes of a shape may be modified in an attempt to fit the text 52D within the shape. It should also be appreciated that the constraints and constraint rules may be specified on a per shape basis. Constraints and constraint rules may also be specified for a set of shapes.

Referring now to FIG. 6, the contents of a portion of an illustrative graphic definition file 40 will be described. In particular, the graphic definition file 40 includes one or more constraints 60. The constraints 60 comprise initial values describing how a shape and text within the shape should be laid out. For instance, the constraints 60 shown in FIG. 6 include a constraint for setting the width of the shape to 1.5 inches. Another constraint sets the height of the shape to 0.667 times the width. Yet another constraint sets the text size for a parent shape to 36 points and another constraint sets the text size for a child shape to 36 points. These constraints are utilized to initially lay out the shape and its associated text. Parameters may also be specified within the file 40.

The graphic definition file also includes one or more constraint rules 62. The constraint rules 62 are a description of how to modify a set of constraints if they are unable to be met by a layout algorithm. For instance, the constraint rules 62 shown in FIG. 5 include a first constraint rule indicating that the width of the shape may be increased up to 3 inches in steps of 0.25 inches. If application of the first constraint rule does not result in the text fitting within the shape, the next constraint rule is applied. The next constraint rule indicates that the height of the shape may be increased up to 1.5 times the width of the shape. If this constraint rule does not result in a good fit of the text, then the next rule is applied sequentially until no additional constraint rules remain. The other constraint rules shown in FIG. 5 decrease the font size of the parent text down to a minimum of 16 points, decrease the font size of child text down to a minimum of 16 points, increase the height up to 3 inches and decrease the size of the parent text down to four points. It should be appreciated that default values may be utilized for constraints not specifically defined in the file 40.

Figure 7:
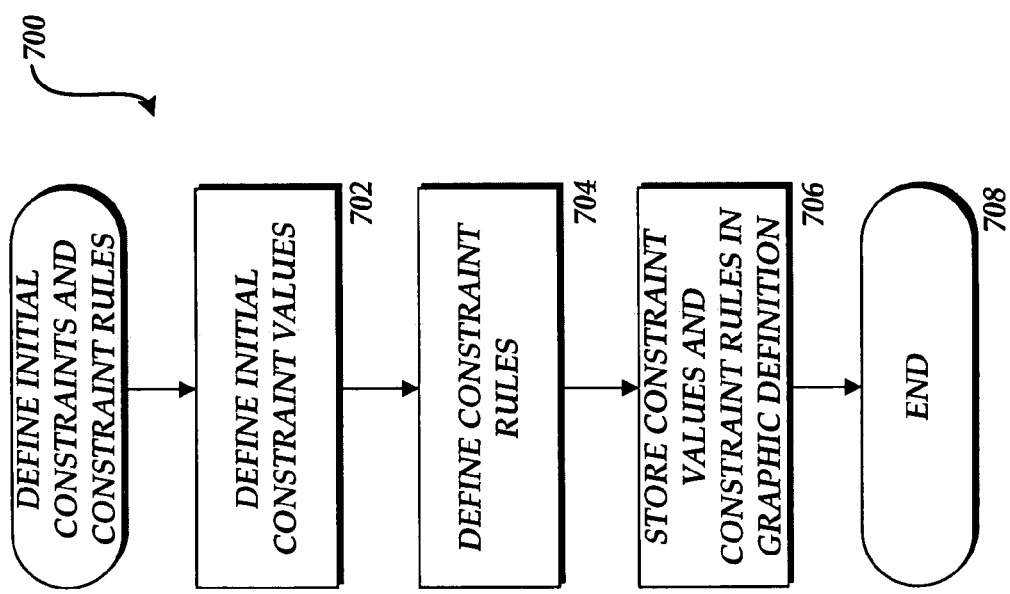
FIGS. 7-8B are flow diagrams illustrating several routines for fitting text to one or more shapes within a graphic according to one embodiment of the invention.

Referring now to FIG. 7, an illustrative routine 700 will be described illustrating a process for defining initial constraints and constraint rules. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 7 and 8, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 700 begins at operation 702, where the initial constraint values are defined. The routine 700 then continues to operation 704, where the constraint rules are defined. From operation 704, the routine 700 continues to operation 706, where the constraint values and constraint rules are stored in the graphic definition file 40. The routine 700 then continues to operation 708, where it ends.

Figure 8A:
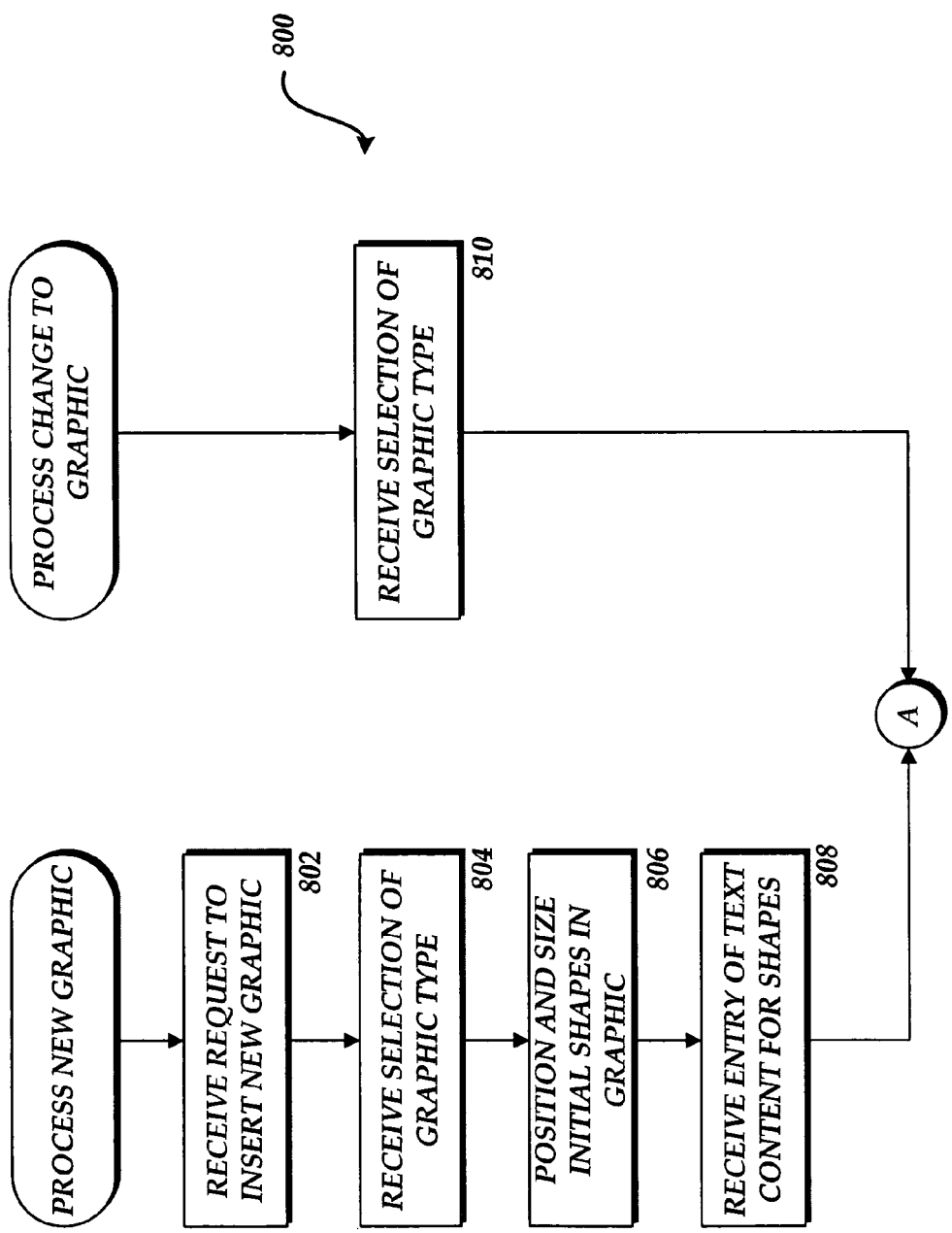
Figure 8B:
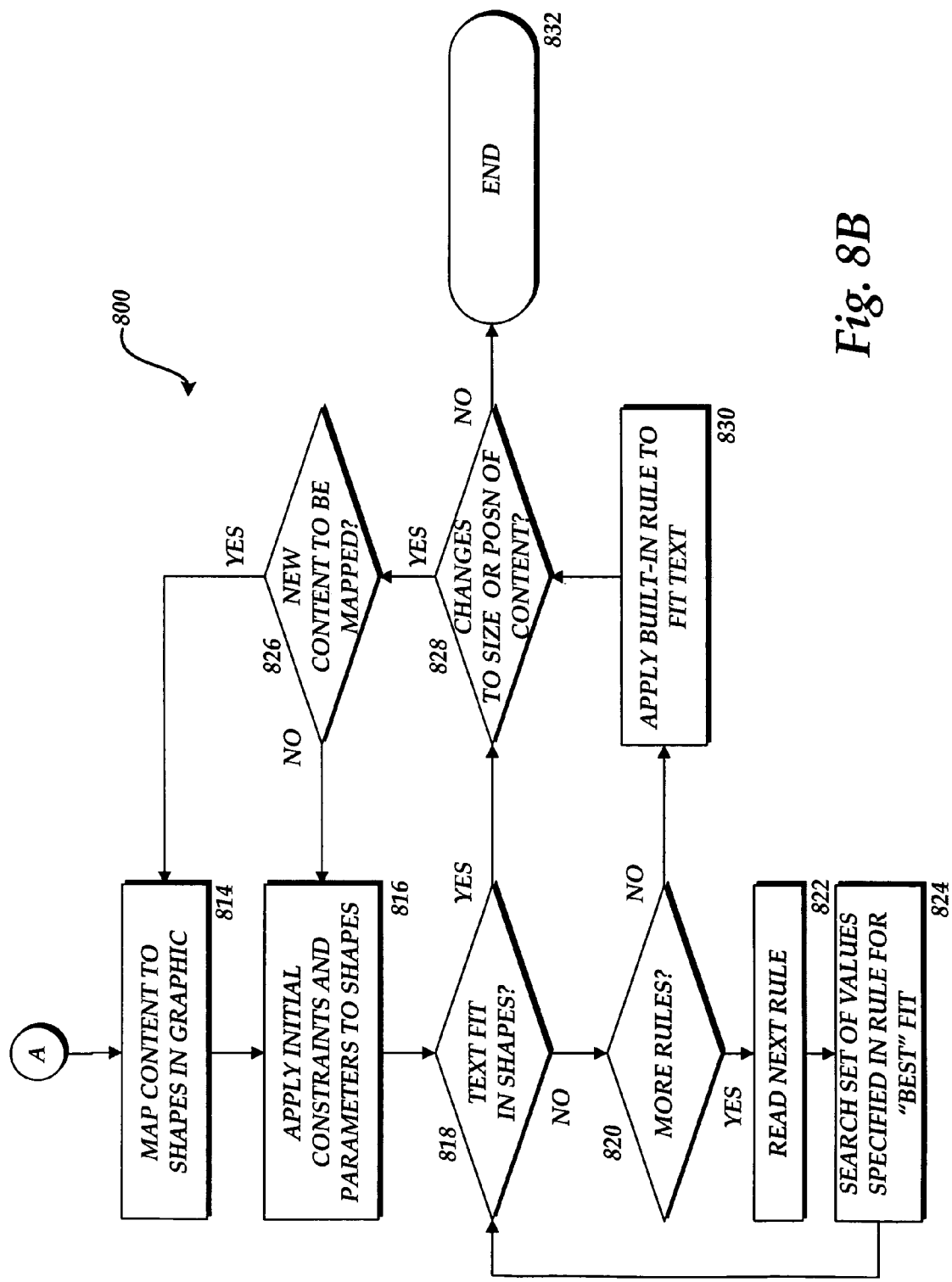

Referring now to FIGS. 8A and 8B, an illustrative routine 800 will be described for fitting text to a shape. The routine 800 begins at operation 802 if a request to create a new graphic is received. In this case, a request is received at operation 802 to insert a new graphic. The routine 800 then continues to operation 804, where a selection of the new graphic type is received. The routine 800 then continues to operation 806, where the initial shapes in the graphic are positioned. The shapes may be position according to the initial constraints. From operation 806, the routine 800 continues to operation 808, where text is received to be placed in the shapes. The routine 800 then continues to operation 814, described below.

The routine 800 begins at operation 810 if the graphic type is modified. In this case, a selection of the new graphic type is received at operation 810. From operation 810, the routine 800 continues to operation 814, described below.

At operation 814, the text content is mapped to shapes within the graphic. The routine 800 then continues to operation 816 where the initial constraints are applied to the shapes. Parameters may also be applied to the shapes. For instance, color may be a parameter since modifying the color of text will not change the size or position of the text. From operation 816, the routine 800 continues to operation 818.

At operation 818, a determination is made as to whether the text fit into each of the shapes. If the text does not fit, the routine 800 continues to operation 820, where a determination is made as to whether there are additional constraint rules in the graphic definition file to process. If additional constraint rules remain to be processed, the routine continues to operation 822. At operation 822, the next constraint rule is read from the graphic definition file. The routine 800 then continues to operation 824, where the set of values specified in the constraint rule is searched to determine the best fit for the text. For instance, if the initial constraint specifies that the width of the shape should be 1.5 inches and the constraint rule specifies that the width may be increased to a limit of 3 inches, a search is performed to identify the smallest value between 1.5 and 3 inches that will result in the text fitting within the shape. According to one embodiment, a binary search is utilized. However, it should be appreciated that other type of algorithms may be utilized to identify the best fit value in addition to search algorithms.

It should be appreciated that, according to one embodiment of the invention, a modified binary search algorithm is utilized that continues searching for a value that is closer to the starting value, even after a successful value has been located. This process continues until the first result that allows a fit is within a predefined threshold of a subsequent value that results in a fit. In this manner, a best fit value can be located.

Once the search for a best fit value has been performed utilizing the current constraint rule, the method 800 returns to operation 818 where another determination is made as to whether the text fits within the shape. If the text does not fit, the above process is repeated with respect to operations 820, 822, and 824. If the text does fit, the routine 800 branches from operation 818 to operation 828.

It should be appreciated that, according to one embodiment, the values identified by the search routine as the best fit for the shape having overflowing text may be propagated to other shapes. In this manner, related shapes may be resized for consistency thereby saving users from having to manually resize related shapes.

At operation 828, a determination is made as to whether there have been changes to the size or position of any content within the graphic. If there have not been changes, the routine 800 branches to operation 832, where it ends. If there have been changes, the routine 800 branches to operation 826, where a determination is made as to whether there is new content to be mapped to a shape within the graphic. If there is new content to be mapped, the routine 800 branches from operation 826 to operation 814, described above. If there is no new content to be mapped, the routine branches from operation 826 to operation 816, described above.

If, at operation 820, it is determined that there are no additional constraint rules to process then the routine 800 branches from operation 820 to operation 830. At operation 830, a predefined rule is applied to the shape that is guaranteed to ensure that text does not flow outside the shape. For instance, according to one embodiment of the invention, the text may be truncated and ellipses (" . . . ") added to the end of the text to indicate the truncation. Sufficient text may be truncated so that the remaining text fits entirely within the shape. Other types of rules guaranteed to ensure that text will not flow outside the shape may be applied. From operation 830, the routine 800 branches to operation 828, described above.

Based on the foregoing, it should be appreciated that the various embodiments of the invention include a method and computer-readable medium for fitting text to shapes within a graphic. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for fitting text to at least one shape in a graphic, the method comprising:

determining at least one property associated with the text, wherein the at least one property associated with the text comprises one of the following: alignment, margin, and spacing;

modifying the at least one property associated with the text, wherein modifying the at least one property associated with the text is based on a defined association between the at least one property and the at least one shape in the graphic;

defining at least one initial constraint and at least one constraint rule for fitting the text to the at least one shape, the at least one constraint rule and the at least one initial constraint being defined for at least one of the following: the at least one shape and a set of shapes, wherein defining the least one initial constraint comprises attaching a shared propagator to the at least one initial constraint that propagates a state of the at least one initial constraint to at least one layout node;

applying the at least one initial constraint to fit the text within the at least one shape;

detecting that the text did not fit within the at least one shape;

in response to detecting that the text did not fit within the at least one shape, applying the at least one constraint rule to modify at least one initial constraint;

reapplying the modified at least one initial constraint to the at least one shape to create a new layout for the graphic;

determining whether a diagram type associated with the graphic has been changed;

in response to determining that the diagram type associated with the graphic has been changed, determining whether a change in the diagram type has caused a change in at least one of the following: a size of the at least one shape and a position of the at least one shape;

in response to determining that the change in the diagram type has caused a change in at least one of the following: the size of the at least one shape, and the position of the at least one shape, determining whether the text within the at least one shape needs to be re-mapped;

in response to determining that the text within the at least one shape need to be re-mapped, re-mapping the text to the at least one shape in the changed diagram type and applying at least one new constraint associated with the changed diagram type to the at least one property associated with the text, wherein applying the at least one new constraint associated with the changed diagram type to the at least one property is defined by the association of the at least one property to the at least one shape in the graphic, the at least one new constraint being defined as a result of the changed diagram type; and in response to applying the at least one new constraint associated with the changed diagram type to the at least one property associated with the text, displaying the graphic on a display screen.

2. The method of claim 1, wherein the at least one initial constraint comprise initial values describing how the at least one shape and the text within the at least one shape should be laid out.

3. The method of claim 2, wherein the at least one constraint rule comprise rules for modifying the at least one initial constraint when application of the at least one initial constraint does not result in the text being successfully laid out within the at least one shape.

4. The method of claim 3, further comprising:

detecting a change to the graphic that results in the text not fitting within the at least one shape; and in response to detecting the change, applying the at least one constraint rule to modify at least one of the following: the at least one initial constraint and an application of the at least one modified constraint to the at least one shape.

5. The method of claim 4, wherein applying the at least one constraint rule to modify the at least one initial constraint comprises:

Identifying the at least one shape for which the text will not fit inside the at least one shape;

identifying a first constraint rule associated with the identified at least one shape, the first constraint rule identifying a limit for a constraint;

identifying a best fit value of the at least one initial constraint between an initial constraint value and a limit that will result in the text fitting within the identified at least one shape;

determining whether a value was identified for the at least one initial constraint that results in the text fitting within the identified at least one shape; and in response to determining that the value was identified that results in the text fitting within the identified at least one shape, applying the identified value to the at least one shape.

6. The method of claim 5, further comprising:
in response to determining that the value was identified that results in the text fitting within the identified at least one shape, applying the identified value to at least one other shape.

7. The method of claim 5, further comprising:
in response to determining that value was not identified that results in the text fitting within the identified at least one shape, identifying and applying a next constraint rule to the at least one shape.

8. The method of claim 7, further comprising applying the limit for the at least one constraint specified by the first constraint rule prior to applying the next constraint rule to the at least one shape.

9. The method of claim 8, further comprising in response to determining that application of all of the at least one constraint rule to the at least one shape did not result in the text fitting within the at least one shape, applying a predefined rule to the at least one shape guaranteed to ensure that the text does not flow outside the at least one shape.

10. The method of claim 9, wherein identifying the best fit value comprises performing a binary search.

11. The method of claim 9, wherein the at least one initial constraint and the at least one constraint rule are specified in a graphic definition file associated with the graphic.

12. The method of claim 1, wherein the at least one shape comprises a compound shape consisting of a parent shape and at least one child shape.

13. A system for fitting text to at least one shape in a graphic, the system comprising:
a memory storage; and
a processing unit coupled to the memory storage, wherein the processing unit is operative to:
determine at least one property associated with the text wherein the at least one property associated with the text comprises one of the following: alignment, margin, and spacing;
modify the at least one property associated with the text based on a defined association between the at least one property associated with the text and the at least one shape in the graphic;
store at least one initial constraint and at least one constraint rule for laying out the text within the at least one shape by attaching a shared propagator to the at least one initial constraint that propagates the at least one initial constraint's state to at least one layout node;
apply the at least one initial constraint to the at least one shape to lay out the text within the at least one shape;
detect a change to the graphic that causes the text not to fit within the at least one shape;
in response to detecting the change, apply the at least one constraint rule to modify the at least one initial constraint;
reapply the modified at least one initial constraint to the at least one shape to create a new layout for the graphic;
determine whether a diagram type associated with the graphic has been changed;
in response to determining that the diagram type associated with the graphic has been changed, determine whether a change in the diagram type has caused a change in at least one of the following: a size of the at least one shape, and a position of the at least one shape;
in response to determining that the change in the diagram type has caused a change in at least one of the following: the size of the at least one shape, and the position of the at least one shape, determine whether the text within the at least one shape needs to be re-mapped; and
in response to determining that the text within the at least one shape need to be re-mapped, re-map the text to the at least one shape in the changed diagram type and applying at least one new constraint associated with the changed diagram type to the at least one property associated with the text according to a defined association of the at least one property to the at least one shape in the graphic and wherein the at least one new constraint is defined as a result of the changed diagram type.

14. The system of claim 13, wherein the at least one initial constraint comprise initial values describing how the text within the at least one shape should be laid out.

15. The system of claim 14, wherein the at least one constraint rule comprise rules for modifying the at least one initial constraint when application of the at least one initial constraint does not result in the text being successfully laid out within the at least one shape.

16. The system of claim 15, wherein detecting a change to the graphic that may affect at least one of the following: a size of the at least one shape and a position of the at least one shape comprises at least one of the following: detecting an addition of the at least one shape, removal of the at least one shape, a change to the layout of the graphic, an addition of the text to the graphic, and removal of the text from the graphic.

17. The system of claim 15, wherein the processing unit being further operative to apply the at least one constraint rule to modify the at least one initial constraint by:
identifying the at least one shape for which the text will not fit inside the at least one shape;
identifying a first constraint rule associated with the identified at least one shape, the first constraint rule identifying a limit for the at least one initial constraint;
identifying a value of the at least one initial constraint between the at least one initial constraint value and the limit that will result in the text fitting within the identified at least one shape;
determining whether a value was identified for the at least one initial constraint that results in the text fitting within the identified at least one shape; and
in response to determining that the value was identified that results in the text fitting within the identified at least one shape, applying the identified value to the at least one shape.

18. A computer-readable storage medium having computer-executable instructions which when executed perform a method for fitting text to at least one shape in a graphic, the method executed by the computer-executable instructions comprising:
determining at least one property associated with the text, wherein the at least one property associated with the text comprises one of the following: alignment, margin, and spacing;
modifying the at least one property associated with the text, wherein modifying the at least one property associated with the text is based on a defined association between the at least one property and the at least one shape in the graphic;

determining whether a diagram type associated with the graphic has been changed;

in response to determining that the diagram type associated with the graphic has been changed, determining whether a change in the diagram type has caused a change in at least one of the following: a size of the at least one shape, and a position of the at least one shape;

in response to determining that the change in the diagram type has caused a change in at least one of the following: the size of the at least one shape, and the position of the at least one shape, determining whether the text within the at least one shape needs to be re-mapped;

in response to determining that the text within the at least one shape need to be re-mapped, re-mapping the text to the at least one shape in the changed diagram type and applying at least one new constraint associated with the changed diagram type to the at least one property associated with the text, wherein applying the at least one new constraint associated with the changed diagram type to the at least one property is defined by the association of the at least one property to the at least one shape in the graphic, the at least one new constraint being defined as a result of the changed diagram type;

storing, in a first data structure, a first set of data fields containing data representing at least one initial constraint for fitting the text to the at least one shape in the graphic, wherein the at least one initial constraint comprises a shared propagator attached to the at least one initial constraint that propagates the at least one initial constraint's state to at least one layout node; and storing, in the first data structure, a second set of data fields containing data representing at least one constraint rule for fitting the text to the at least one shape, wherein the at least one constraint rule comprise rules for modifying the at least one initial constraint when application of the at least one initial constraint does not result in the text being successfully laid out within the at least one shape.

19. The computer-readable storage medium of claim 18, wherein the at least one initial constraint comprises initial values describing how the text within the at least one shape is to be laid out.

20. The computer-readable storage medium of claim 18, wherein the at least one constraint rule comprises a limit value for the at least one initial constraint.

* * * * *

UNITED STATES PATENT AND TRADEMARK OFFICE
CERTIFICATE OF CORRECTION

PATENT NO.         : 7,743,325 B2                                                  Page 1 of 1
APPLICATION NO.    : 11/081324
DATED              : June 22, 2010
INVENTOR(S)        : Ilan Berker et al.

It is certified that error appears in the above-identified patent and that said Letters Patent is hereby corrected as shown below:

In Page 3, item (56), column 2, Line 22, under "Other Publications" below "Application No. 2005203708." insert -- Chinese Third Office Action dated June 19, 2009 cited in Application No. 200610004498.4 --.

Signed and Sealed this
Fifteenth Day of February, 2011

David J. Kappos
*Director of the United States Patent and Trademark Office*